(12) United States Patent
Iofinov

(10) Patent No.: US 8,880,389 B2
(45) Date of Patent: Nov. 4, 2014

(54) COMPUTER IMPLEMENTED SEMANTIC SEARCH METHODOLOGY, SYSTEM AND COMPUTER PROGRAM PRODUCT FOR DETERMINING INFORMATION DENSITY IN TEXT

(76) Inventor: Igor Iofinov, Brooklyn, NY (US)

(*) Notice: Subject to any disclaimer, the term of this patent is extended or adjusted under 35 U.S.C. 154(b) by 564 days.

(21) Appl. No.: 13/315,298

(22) Filed: Dec. 9, 2011

(65) Prior Publication Data
US 2013/0151236 A1 Jun. 13, 2013

(51) Int. Cl.
G06F 17/20 (2006.01)
G06F 17/28 (2006.01)
G06F 17/27 (2006.01)
G06F 17/21 (2006.01)
G10L 21/00 (2013.01)

(52) U.S. Cl.
USPC ............... 704/9; 704/1; 704/2; 704/3; 704/4; 704/5; 704/6; 704/7; 704/8; 704/10; 704/270; 704/270.1; 704/275; 704/278

(58) Field of Classification Search
USPC .................. 704/1–9, 270, 270.1, 275, 278
See application file for complete search history.

(56) References Cited

U.S. PATENT DOCUMENTS

| | | | | |
|---|---|---|---|---|
| 6,081,774 A * | 6/2000 | de Hita et al. | ...................... | 704/9 |
| 6,154,213 A * | 11/2000 | Rennison et al. | .............. | 715/854 |
| 6,675,159 B1 * | 1/2004 | Lin et al. | ................. | 1/1 |
| 7,117,207 B1 * | 10/2006 | Kerschberg et al. | ................... | 1/1 |
| 7,260,573 B1 * | 8/2007 | Jeh et al. | ........................ | 707/708 |
| 7,707,161 B2 * | 4/2010 | Hall et al. | ............... | 707/999.103 |
| 7,769,742 B1 * | 8/2010 | Brawer et al. | .................. | 707/709 |
| 8,005,841 B1 * | 8/2011 | Walsh et al. | .................... | 707/739 |
| 8,020,206 B2 * | 9/2011 | Hubbard et al. | ................. | 726/22 |
| 8,245,135 B2 * | 8/2012 | Cai et al. | ......................... | 715/254 |
| 2001/0049700 A1 * | 12/2001 | Ichikura | ......................... | 707/512 |
| 2002/0052894 A1 * | 5/2002 | Bourdoncle et al. | ........... | 707/513 |
| 2002/0069100 A1 * | 6/2002 | Arberman | ........................ | 705/10 |
| 2003/0182124 A1 * | 9/2003 | Khan | .......................... | 704/270.1 |
| 2003/0182631 A1 * | 9/2003 | Tsochantaridis et al. | ...... | 715/531 |
| 2004/0267730 A1 * | 12/2004 | Dumais et al. | ..................... | 707/3 |
| 2005/0015357 A1 * | 1/2005 | Shahidi | ............................. | 707/1 |
| 2005/0027708 A1 * | 2/2005 | Mueller et al. | ................... | 707/10 |
| 2005/0278309 A1 * | 12/2005 | Evans et al. | ........................ | 707/3 |

(Continued)

OTHER PUBLICATIONS

Alonso, O., Germ., M. and Baeza-Yates, R., Nov. 2009. "Clustering and Exploring Search Results using Timeline Constructions". CIKM'09, 97-106.*

(Continued)

Primary Examiner — Edgar Guerra-Erazo
(74) Attorney, Agent, or Firm — Steven Rinehart

(57) ABSTRACT

A method, computer program product and system are disclosed for determining the semantic density of textualized digital media (a measure of how much information is conveyed in a sentence or clause relative to its length). The more semantically dense text is, the more information it conveys in a given space. Users input a topic, a timeline, and one or more target web media sources for analysis. Text in the target media sources is deconstructed to determine density, and a density rating assigned to the web media source. Over time, users can track trends in the density of text media relative to a given topic, and determine how much information is being conveyed in connection with the topic, such as a political campaign. Line graphs, pie charts, and other time-elapsed output graphic representations of the semantic density are generated and rendered for the user.

20 Claims, 8 Drawing Sheets

(56) References Cited

U.S. PATENT DOCUMENTS

| | | | |
|---|---|---|---|
| 2006/0026013 A1* | 2/2006 | Kraft | 705/1 |
| 2007/0038610 A1* | 2/2007 | Omoigui | 707/3 |
| 2007/0073745 A1* | 3/2007 | Scott et al. | 707/100 |
| 2008/0034058 A1* | 2/2008 | Korman et al. | 709/217 |
| 2008/0162498 A1* | 7/2008 | Omoigui | 707/10 |
| 2008/0263038 A1* | 10/2008 | Judge et al. | 707/6 |
| 2008/0288442 A1* | 11/2008 | Feigenbaum et al. | 707/2 |
| 2009/0138565 A1* | 5/2009 | Shiff et al. | 709/206 |
| 2010/0268700 A1* | 10/2010 | Wissner et al. | 707/706 |
| 2010/0318526 A1* | 12/2010 | Nakazawa et al. | 707/749 |
| 2013/0091090 A1* | 4/2013 | Spivack et al. | 707/608 |

OTHER PUBLICATIONS

Cui, W., Liu, S., Tan, L., Shi, C., Song, Y., Gao, Z., Qu, H., and Tong, X., Dec. 2011. "Textflow: Towards better understanding of evolving topics in text". IEEE Trans. Vis. Comput. Graph. 17, 12 (2011), 2412-2421.*

Liu, S., Zhou, M., Pan, S., Qian, W., Cai, W., Lian, X., Nov. 2009. "Interactive Topic-based Visual Text Summarization and Analysis", CIKM'09, 543-552.*

Wei, F., et al., Jul. 2010. "Tiara: A Visual Exploratory Text Analytic System". KDD'10, Jul. 25-28, 2010, pp. 1-10.*

* cited by examiner

COMPUTER IMPLEMENTED SEMANTIC SEARCH METHODOLOGY, SYSTEM AND COMPUTER PROGRAM PRODUCT FOR DETERMINING INFORMATION DENSITY IN TEXT

BACKGROUND OF THE INVENTION

1. Field of the Invention

This invention relates to information retrieval systems, and more particularly relates to a computer implemented method and system for determining the information density of a target body of digital text.

2. Description of the Related Art

With the emergence of the Internet has come access to almost limitless amounts of information. Users typically seek access to this information with computer in logical communication with an information-retrieval system like Google® or other search engines. These search engines typically comprise a graphical user interface for accepting keywords used to identify relevant information, typically in the form of online electronic documents.

Typical search engines rank the importance of a document by the number of instances that the keyword appears in the body of text forming the document, the number of backlinks to the document, and the importance of the documents comprising the backlinks. This is problematic because many documents included in a given set of search results contain only superficial references to the keywords, and users are left to manually filter through irrelevant results in search for the documents conveying more denser amounts of information.

There exists no efficient means in the art of valuing the context in which keywords are appearing, or of determining the information density of sentences and clauses comprising the keywords and it synonyms. Methods, computer program products and systems are lacking in the art which determining the semantic density of textualized digital media. Semantic density is a measure of how much information is conveyed in a sentence or clause relative to its length in a given block of text. The more semantically dense text is, the more information it conveys in a given space.

The semantic density of text with regard to a particular topic is a useful metric to users desiring to measure trends in online chatter, news, such as a political campaign.

The present invention beneficially teaches a unique computer implemented methodology for determining the semantic word density of bodies of text in digitized documents which overcomes prior shortcomings in art.

SUMMARY OF THE INVENTION

From the foregoing discussion, it should be apparent that a need exists for a method, system, and computer program product for determining the semantic word density of a body of text. The present invention has been developed in response to the present state of the art; and, in particular, in response to the problems and needs in the art that have not yet been fully solved by currently available methods, systems, computer program products and apparatii, which invention overcomes many or all of the above-discussed shortcomings in the art. Accordingly, the present invention has been developed to provide a method, computer program product, and system for determining semantic word density.

A computer program product is disclosed, comprising a computer readable medium, having computer usable program code executable to perform operations for determining a semantic density of textualized digital web media, the operations of the computer program product comprising: compiling a list of web media sources for analysis in computer readable memory; querying the web media sources for a block of text; storing the block of text in volatile computer readable memory; identifying sentences within the block of text; storing the sentences as strings within an array; scanning each sentence to quantify one or more of the following: a number of words in the sentence; a number of prepositions, postpositions, adjectives, adverbs, verbs, nouns, and grammatical conjunctions, by referencing words within the sentence with a dictionary in computer readable memory; a number of dependent clauses in the sentence; a number of independent clauses in the sentence; a number of ellipsis, a number of dashes (both en dashes and em dashes), and a number of commas, semicolons, and colons; a number of subjects and predicates in the sentence; a number of appositions in the sentence; a number of syllables in each word of the sentence by cross-referencing each word with the dictionary in persistent storage; and a number of alphanumeric characters in the sentence; storing each quantified number in a persistent computer readable database with a time-stamp identifying the date the number(s) were quantified; calculating a semantic density score for each web media source in the list of web media sources, wherein the semantic density score is a function of the quantified numbers for each sentence in the web media source; and storing the semantic density score in a persistent computer readable database, the score exclusively associated with the web media content from which the score was derived.

In some embodiments, the computer program product of further comprises: prompting a user with a webpage to input a topic for semantic density determination; prompting the user with a webpage to input a timeline for semantic density determination; prompting the user with a webpage to input URLs for one or more web media sources; determining synonym(s) for the topic by referencing a thesaurus in computer readable memory; querying textualized media on the web media source for instances of the topic; querying textualized media on the web media source for instances of synonyms of the topic identified by referencing the dictionary; storing semantic density ratings for sentences comprising the topic; storing semantic density ratings for sentences comprising the synonyms of the topic; and rendering a graph on a computer display showing elapsed time across one axis, the graph showing a plurality of semantic density ratings for the web media identified by the user.

The web media sources may be queried at predetermined intervals of time.

The list of web media sources may consist of web media sources manually identified by one or more users to the website. The sentences may be identified within the block of text as being a string of text preceding a period immediately followed by a space.

Therein sentences may be identified within the block of text as being a string of text following a period (.) immediately followed by a space ( ) which string of text also precedes a period (.) immediately followed by a space ( ).

The computer program product may further comprise storing a dictionary in computer readable memory, the dictionary identifying words of a language, the dictionary characterizing each word as one or more of a noun, verb, adverb, adjective, and preposition, the dictionary identifying a number of syllables in each word.

In some embodiments, a dependent clause in the sentence may be identified as a string of text not comprising a verb within two commas. An independent clause in the sentence may be identified as a string of text comprising a verb within two commas. The semantic density score may further be a function of the number of sentences appearing in the block of text. A database query may be generated using the topic and synonyms, wherein the sentences are stored in a database in computer readable memory and queried with the database query by a DBMS.

The computer program product may further comprise rendering a graph on a computer display showing elapsed time across one axis, the graph showing a plurality of semantic word density ratings for the web media identified by the user.

A system to perform operations for relaying commercial offerings from select merchants to select consumers is also disclosed, the system comprising: a webserver; a semantic indexing server; an RDBMS; a topic prompter module configured to prompt a user with a graphic user interface to input a topic for semantic density determination; a timeline prompter module configured to prompt the user with a graphic user interface to input a timeline for semantic density determination; a URL prompter module configured to prompt the user with a graphic user interface to input URLs for one or more web media sources, the URLs compiled into a list of web media sources for analysis in computer readable memory; a synonym determiner module configured to determine synonym(s) for the topic by referencing a thesaurus in computer readable memory; a block storer module configured to store the blocks of text forming the web media sources in volatile computer readable memory; and a sentence identifier module configured to identify sentences within the block of text.

The system further comprises a sentence parser module configured to parse each sentence to quantify one or more of the following: a number of words in the sentence; a number of prepositions, postpositions, adjectives, adverbs, verbs, nouns, and grammatical conjunctions, by referencing words within the sentence with a dictionary in computer readable memory; a number of dependent clauses in the sentence; a number of independent clauses in the sentence; a number of ellipsis, a number of dashes (both en dashes and em dashes), and a number of commas, semicolons, and colons; a number of subjects and predicates in the sentence; a number of appositions in the sentence; a number of syllables in each word of the sentence by cross-referencing each word with the dictionary in persistent storage; and a number of alphanumeric characters in the sentence.

The system further comprises a value storer module configured to store each quantified number in a persistent computer readable database with a time-stamp identifying the date the number(s) were quantified; a calculator module configured to calculate a semantic density score for each web media source in the list of web media sources, wherein the semantic density score is a function of the quantified numbers for each sentence in the web media source; a density storer module configured to store the semantic density score in a persistent computer readable database, the score exclusively associated with the web media content from which the score was derived; a text querier module configured to query textualized media on the web media source for instances of the topic; a synonym query module configured to query textualized media on the web media source for instances of synonyms of the topic identified by referencing the dictionary; and a render module configured to render a graph on a computer display showing elapsed time across one axis, the graph showing a plurality of semantic density ratings for the web media identified by the user.

A second computer program product is disclosed comprising a computer readable medium having computer usable program code executable to perform operations for determining a semantic density of textualized digital web media, the operations of the computer program product comprising: prompting a user with a graphic user interface to input one or more keyword(s) for semantic density determination; prompting the user with the graphic user interface to input a timeline for semantic density determination; prompting the user with the graphic user interface to input domain names for one or more web media sources, the domain names compiled into a list of web media sources for analysis in computer readable memory; storing the blocks of text in the web media sources in volatile computer readable memory; and identifying sentences within the block of text, wherein sentences are identified within the block of text as being a string of text following a period (.) immediately followed by a space ( ) which string of text also precedes a period (.) immediately followed by a space ( ).

The computer program product further comprises storing the sentences as strings within an array; identifying clauses within the sentences satisfying one or more of the criteria from the group consisting of: a string of text enclosed ellipsis; a string of text enclosed by en dashes a string of text enclosed by em dashes; a string of text within the sentence enclosed by one or more of commas, semicolons, and colons; storing the identified clauses as strings within an array; calculating a semantic density score for each web media source in the list of web media sources, wherein the semantic density score is a function of the number of clauses in each sentence of the web media source; storing the semantic density score in a persistent computer readable database, the score exclusively associated with the web media content from which the score was derived; determining synonym(s) for the keyword by referencing a thesaurus in computer readable memory; querying the sentences for instances of the keyword and synonyms; storing semantic density ratings for sentences comprising the keyword and synonyms; rendering a graph on a computer display showing elapsed time across one axis, the graph showing a plurality of semantic density ratings for the web media identified by the user.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention. The apparatus modules recited in the claims may be configured to impart the recited functionality to the apparatus.

Figure 1:
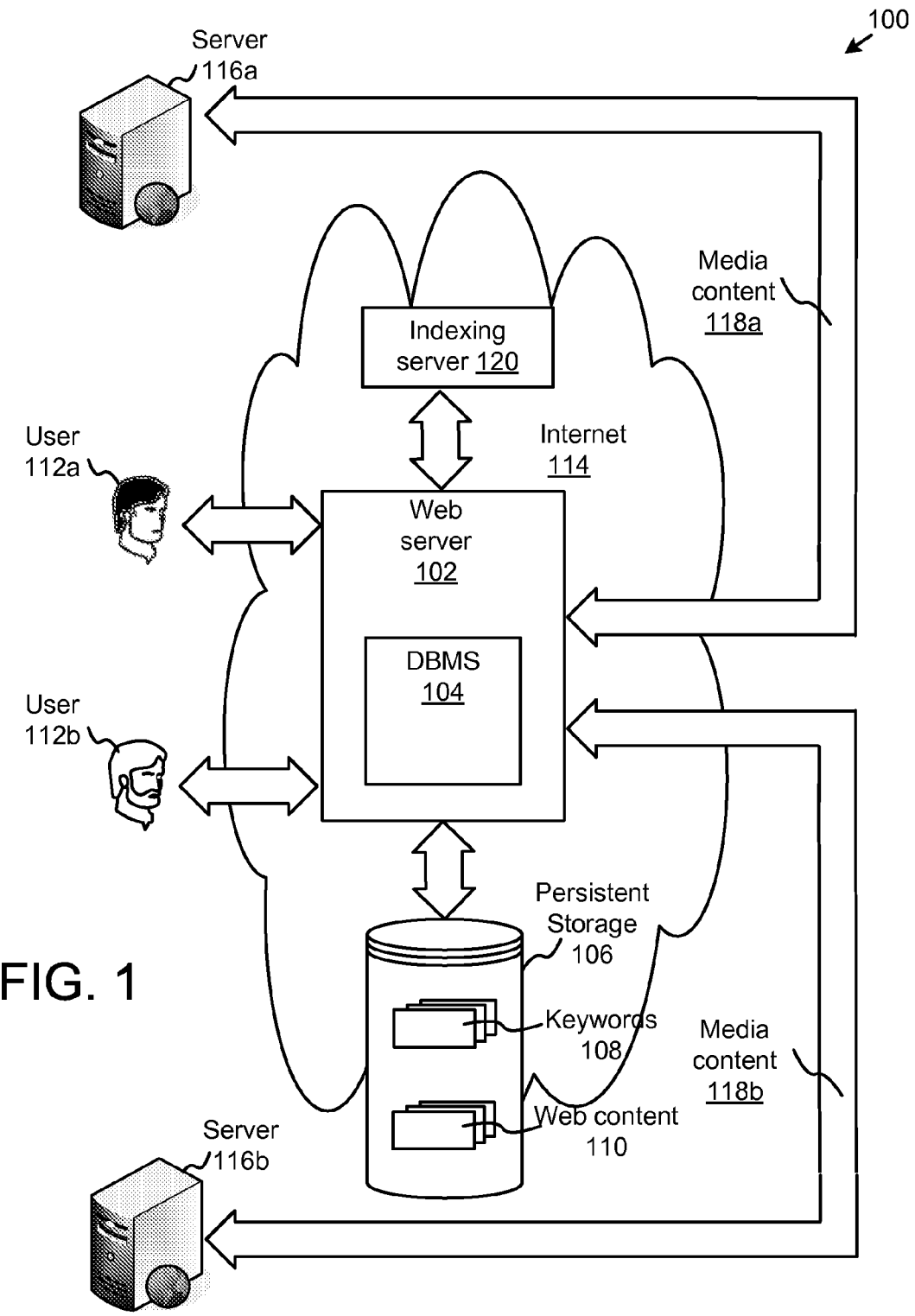
FIG. 1 is a UML deployment diagram illustrating one embodiment of a system for determining semantic word density in accordance with the present invention.

FIG. 1 is a UML deployment diagram illustrating one embodiment of a system 100 for determining semantic word density in accordance with the present invention. The system 100 comprises a web server 102, a DBMS 104, persistent storage 106, keywords 108, web content 110, a user 112a, a user 112b, a network 114, a server 116a, a server 116b, media content 118a, media content 118b, and an indexing server 120.

The web server 102 may also comprise a computer program running on one or more data processing devices (DPDs), such as a server, computer workstation, router, mainframe computer, or the like. In various embodiments, the DPD comprises one or more processors. The processor is a computing device well-known to those in the art and may include an application-specific integrated circuit ("ASIC").

A legal entity controls the web sever 102. This legal entity may comprise any individual, organization, entity, or combination thereof, tasked with administering the server 102. The legal entity may be a legal entity, such as a partnership, limited liability company (LLC), corporation, joint venture, municipality, d/b/a, or the like. Information may be routed from the sever 102 and/or from the indexing server 120 to any DPD, device, person, merchant, consumer, company, organization, or the like, in logical communication with the server 102.

The server 102 communicates via the Internet 114 with the DPDs of users 112a-b through PCs, smart phones, or other personal DPDs such as laptops, Palm Pilots®, digital cameras, and the like. The server 102 may be in logical communication with users 112a-b through a networked environment such as the Internet 114. The Internet 114 may comprise a local area network (LAN) or wide area network (WAN). The server 102 may email search results to users 112a-b using variations of the Simple Mail Transfer Protocol (SMTP), Internet Message Access Protocol (IMAP), Post Office Protocol (POP), or other protocols well-known to those of skill in the art.

The web server 102, in the shown embodiment, comprises a database management system (DBMS) 104 or relational database management system (RDBMS), such as Oracle, MySQL, SQL, FireBird, IBM DB2®, or the like.

In the shown embodiment, one or more users 112 login to an account they have created with the server 102, wherein the account information is stored in computer readable database memory 106 accessible by the server 102. In other embodiments, it is not necessary for the users 112a-b to have accounts with the server 102.

The users 112a-b may comprise any individual, organization, or group of individuals interested in the trends of semantic word density of a general or specific topic over a period of time. The users 112a-b access the web server 102 via the Internet 114, interfacing with the server 102 using a graphic user interface on a DPD local to the users 112a-b (this graphic user interface usually comprising a website shown in an Internet browser on a computer display).

The servers 116a-b, in the shown embodiment, comprises DPDs hosting third-party website with digital media content 118a-b, which content 118a-b is accessible via the Internet or another network by the server 102 and/or the server 120.

The users 112a-b submit topics for processing to the sever 102. These

The indexing server 120 scans textualized web media content for text blocks, and parses text found on the web media sources into sentences, which sentences are arrayed in persistent storage 106. Web media content 118a-b gathered from web media sources on the servers 116a-b is transferred to the server 102 and then to the indexing server 120, or alternatively straight to the indexing server 120.

In various embodiments of the present invention, the indexing server 120 is configured to identify and store in volatile or nonvolatile memory 106 copies of text on web media sources identified by the users 112a-b; or pointers or references to those web media sources on servers 116a-b. In various embodiments of the present invention, the sever 102 and/or the indexing server 120 may be configured to scan a network 114 and identify and store in volatile or nonvolatile memory 106 copies of text found on a network, even at sources not identified ahead of time by the users 112a-b.

In some embodiments, this scan is done before a topic for analysis is submitted by the users 112a-b to the server 102. In other embodiments, the scan is done subsequently and only web media sources found to contain references to the topic (or its synonyms) are parsed and stored by the indexing server 120 in memory 106.

In some embodiments, the display may be a cathode ray tube ("CRT"), a liquid crystal display ("LCD"), a plasma display panel ("PDP"), or the like.

Figure 2:
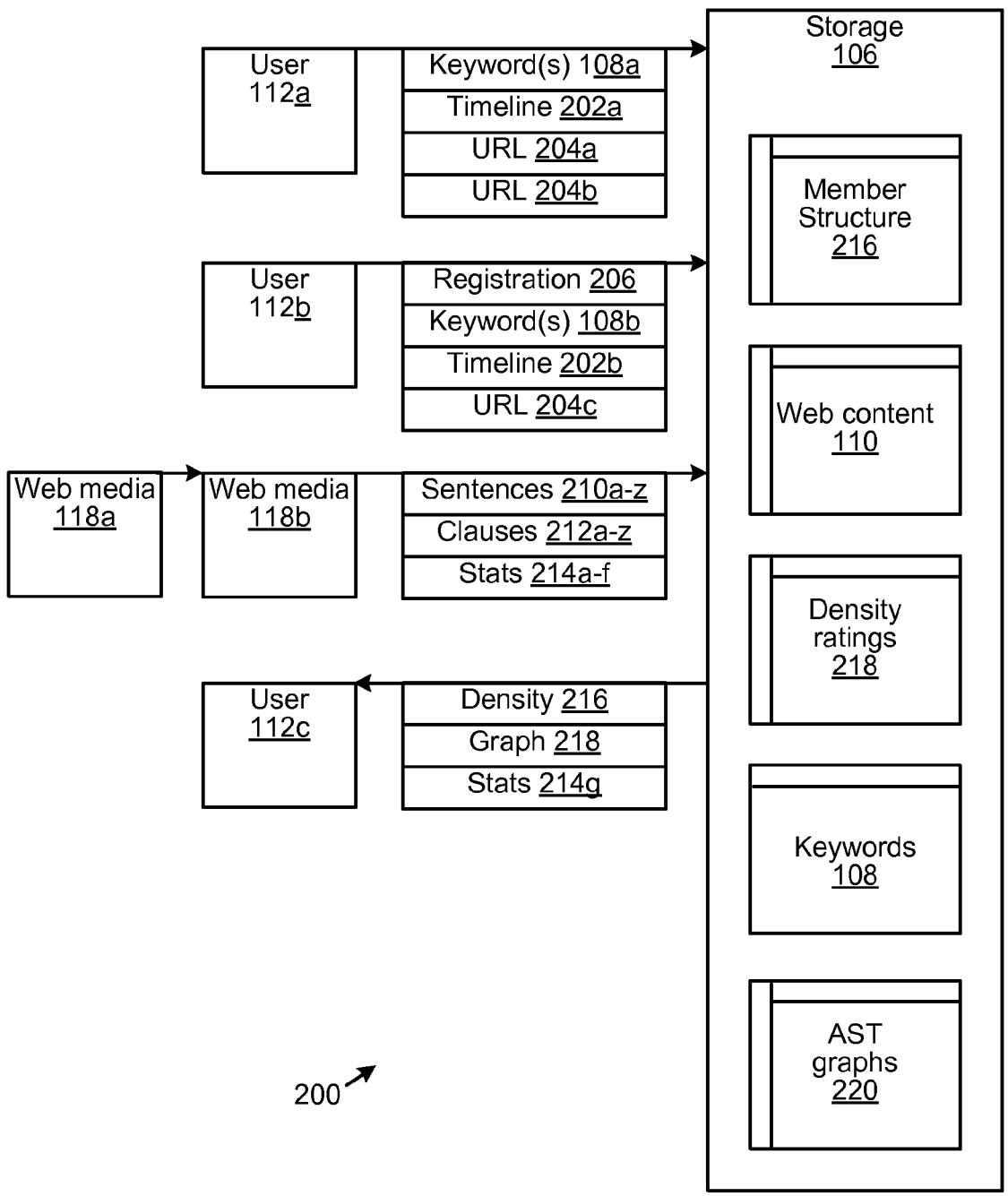
FIG. 2 is a data-entity relationship diagram illustrating the interrelationships and dataflow of the operations and modules of the present invention.

FIG. 2 is a data-entity relationship 200 diagram illustrating the interrelationships and dataflow of the operations and modules of the present invention. The relationship 200 comprises users 112a-c, web media sources 118a-b, and storage 106. The storage 106 comprises computer readable files, including member structure 216, web content 110, density rating 218, keywords 108, and AST graphs 220. Various species of data are transmitted back and forth between the users 112a-c, the web media 118a-b, and storage 106, including keywords 108a-b, timelines 202a-b, URL (Uniform Resource Locators) 204a-c, sentences 210a-z, clauses 212a-z, statistics 214a-g, density data 216, and time elapsed semantic word graphs 218.

In the shown embodiment, user 112a is prompted to upload via a graphic user interface a number of pieces on information to the server 102, including one or more keyword(s) 108a, a timeline 202a with a start date (i.e. start point) and an end date, and plurality of URLs 204a-b.

The keyword(s) 108 connote topics of interest to the users 112a for which the user 112a would like semantic word density information in the form of graphs 218 (shown further in FIGS. 8A-8B below) or statistics 214.

The keyword(s) 108 are stored in a database readable file 108 in storage 106.

A plurality of URLs to web media content 118a-b are identified by the user 112a which the user 112a would like searched for textualized media. The URLs 204a-b are stored in storage 106, and the indexing server 120 scans the web media sources 118a-b identified by the URLs 204a-b for textualized web media content. This textualized web media content is parsed into sentences 210a-z and clauses 214a-f, which sentences 210a-z and clauses 214a-f are timestamped and stored in storage 106. Dependencies between the clauses 212a-z are determined as further described below in relation to FIG. 4 and other subsequent Figures. These dependencies are used to create statistics describing the magnitude of word density contained by each sentence in the respective web media 118 (i.e. density ratings). These density ratings are stored in a database file 218 in storage 106.

Subsequently, these statistics 214a-f can be transferred to another user 112c (or the same user 112a) in the form of time-elapsed graphs 218.

In some embodiments of the present invention, users 112a-c are required to register with the server 102 before they can perform semantic word searches by uploading personal information to the server 102, such as name, email address, age, and the like. This personal information is used to create a member structure 216, which is stored in the database in storage 106.

Figure 3:
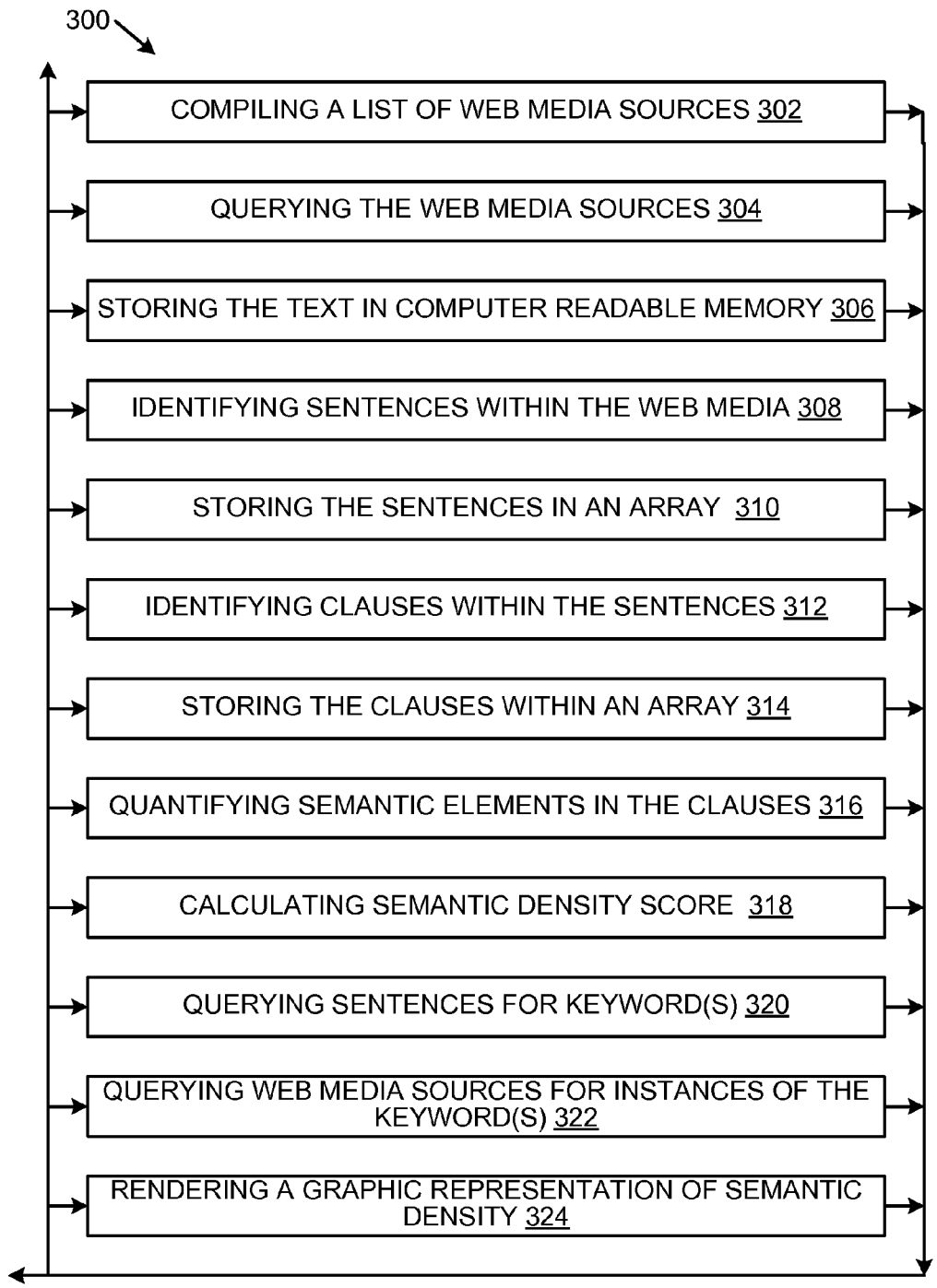
FIG. 3 is a flowchart illustrating method steps of the present invention, including steps which may be performed determining a semantic density of textualized digital web media in accordance with the present invention.

FIG. 3 is a flowchart illustrating method 300 steps of the present invention, including steps which may be performed determining a semantic density of textualized digital web media in accordance with the present invention.

The method 300 begins 302 with a list of domain names and/or ULRs from a user 112 being compiled 302 into a list of web media sources. These web media sources are queried 304 for textualized web media content. This textualized web media content is stored 306 in computer readable memory 106.

Sentences 210 within the web media content 118 are identified and parsed 308 from the rest of the web media content 118. The sentences 210 are stored 310 in an array datastructure.

Clauses 212 are identified 312 and parsed from the sentences 210, then stored 314 in an array.

Dependencies between the clauses are determined using methodology further described below. The types of clauses and dependencies identified are used to increase the values of variables associated with those dependencies, a process through which semantic density is quantified 316. A semantic density score for the each sentence, web media source, and the topic as a whole are calculated 318.

In some embodiments, the sentences 210 are then queried 322 for instances of the topic, or keyword(s) 108, input by a user 112. The sentences 210 may subsequently be queried for instances of synonyms of the keyword(s) 108 ascertained by cross-referencing a digital thesaurus. Alternatively, instances of the keyword(s) 108 in the sentences 210 may be replaced with the synonyms, and the sentences 210 re-quantified 316 for semantic word density.

Finally, a graph of semantic word density for the topic or keyword(s) 108 is displayed 324 for the user 112.

Figure 4:
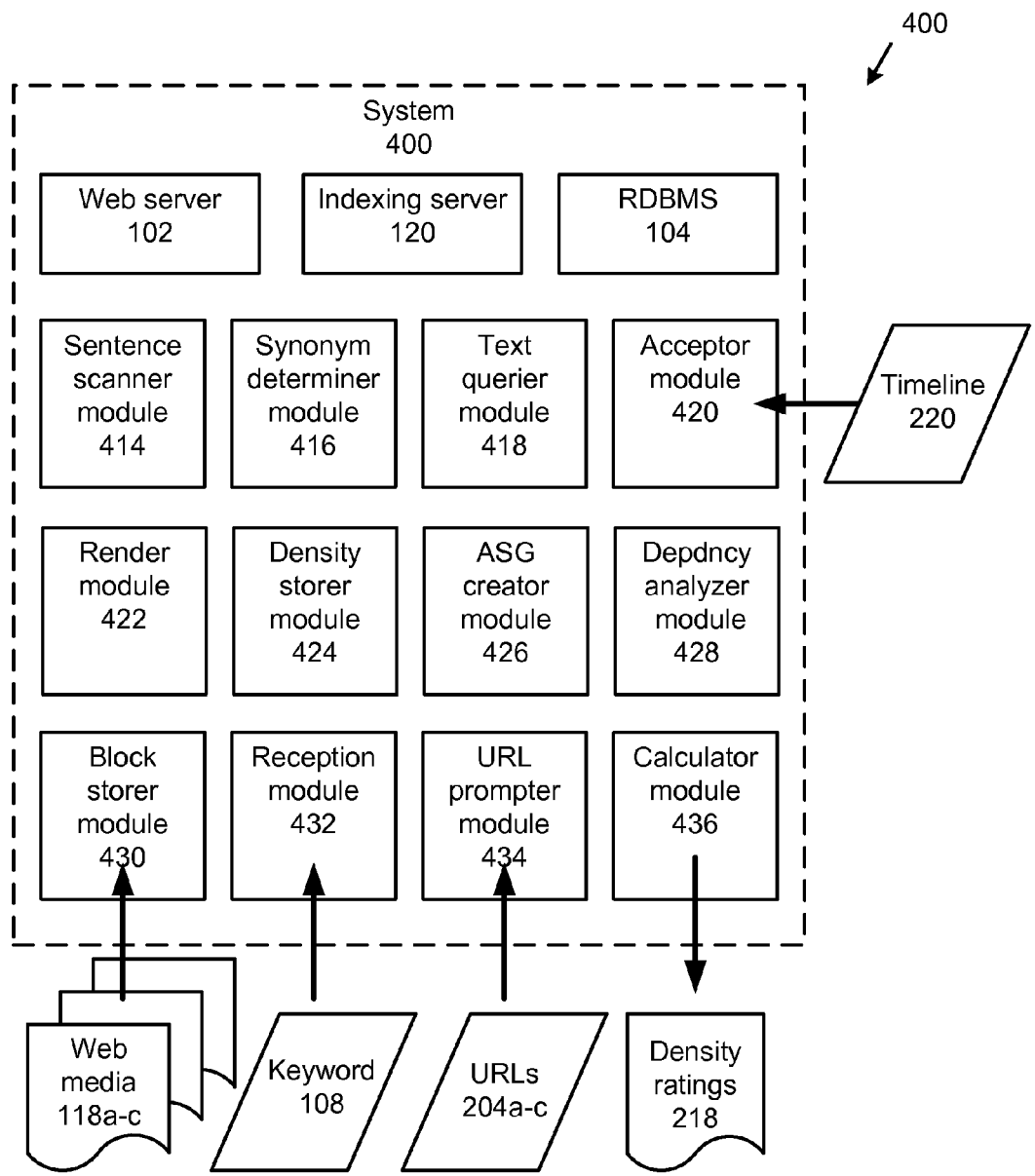
FIG. 4 is a block diagram illustrating one embodiment of a system which determines a semantic density of textualized digital web media in accordance with the present invention.

FIG. 4 is a block diagram illustrating one embodiment of a system which determines a semantic density of textualized digital web media in accordance with the present invention. The system 400 comprises modules largely configured to perform functions corresponding to the steps of the method 300 and computer program product embodiments. These correlations are further described in the claims.

Textualized web media content 118a-c is gathered by the block storer module 430 from web content sources at URLs identified by users 112. A timeline 220, with start and end points, is uploaded by a user 112 to the acceptor module 420. Keywords 108 and URLs 204a-c are also uploaded to the system 400 by the user 112. The user 112 may comprise a human being, group of human beings, or another DPD configured to use the system 400 for information retrieval purposes.

Density ratings 218 are stored in computer readable memory 106 by the indexing server 120 and output in graphical form to the DPD of a user 112.

The system 400 may be said to form a search engine for information analysis and summary.

Figure 5:
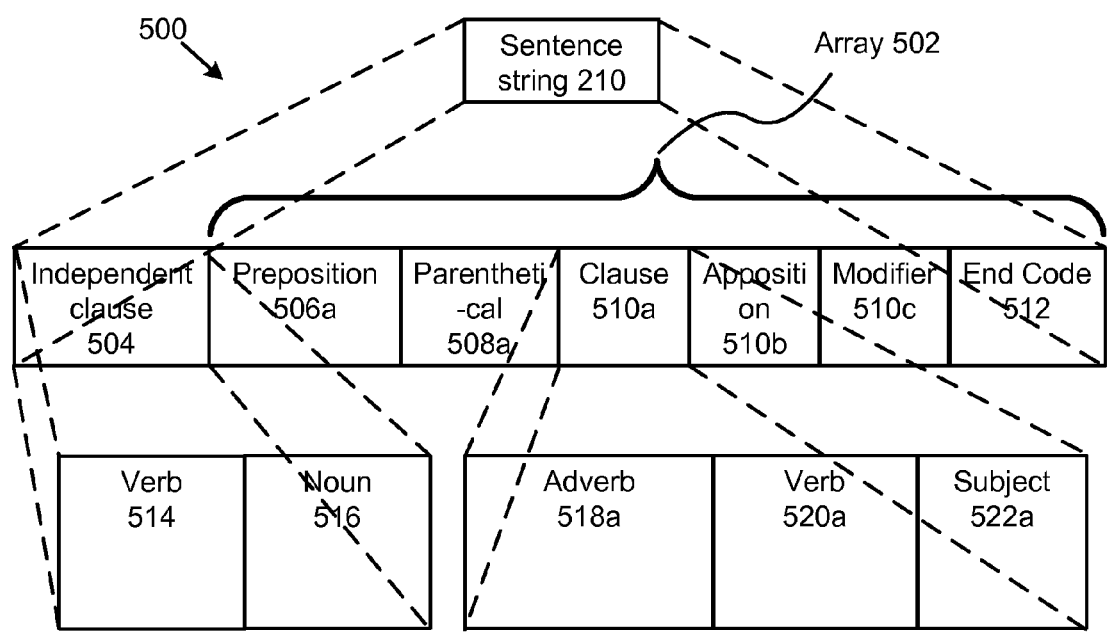
FIG. 5 is sentence content unit subdivided into clauses in accordance with the present invention.

FIG. 5 is sentence content unit 210 subdivided into clauses in accordance with the present invention. Blocks of text in the present invention are parsed into sentences 210. Sentences 210, in some embodiments, are identified as strings of text separated by a period (.) following immediately by a space ( ). In other embodiments, the sentences 210 comprising a string of text not preceded and/or not followed by any text.

Certain unique identifiers are associated with each characteristic of each sentence 210. For each sentence 210 a unique identifier is exclusively associated with a number of words in the sentence; a number of prepositions, postpositions, adjectives, adverbs, verbs, nouns, and grammatical conjunctions, by referencing words within the sentence with a dictionary in computer readable memory; a number of dependent clauses in the sentence; a number of independent clauses in the sentence; a number of ellipsis, a number of dashes (both en dashes and em dashes), and a number of commas, semicolons, and colons; a number of subjects and predicates in the sentence; a number of appositions in the sentence; a number of syllables in each word of the sentence by cross-referencing each word with the dictionary in persistent storage; and a number of alphanumeric characters in the sentence.

The magnitude, or value assigned to these unique idenifiers is representative of the number of times that each characteristic in the sentence in identified. These unique identifiers, along with unique identifiers representing the dependencies between sentence 210 clauses 504-510, are used in determining the informative density, or semantic density of sentences 210; and; consequently, entire blocks of text and web source documents.

The sentence 210 comprises clauses identified by the system 400. The sentences 210 are stored in computer readable memory as encoded content units 210, which units are subjected to analysis by the indexing server 120.

The keywords 108, in the shown embodiment, comprise digitized search terms entered by a user of the search engine. Typically, the keywords 108 are received by the server 102 and relayed to the indexing server 120. The keywords 108 may comprise phrases (one or more words) that relate to content which the user wishes to search, which content typically will relate to the subject matter of interest of the user. In response to reception of the keywords 1-8, the sever 120 may locate information archived in a content library under the control of the sever 120.

The content library may be internal or external to the indexing server 120. In some embodiments, the content library is in logical communication with the indexing server 120 via a distributed network, or through other means well-known to those of skill in the art. In the shown embodiment, the content units 210 are stored in a computer readable database controlled by the database server 101, such as IBM DB2, Oracle, or SQL.

The keywords 108 are formulated into a database query and then associated with a query execution plan which identifies content units within the content library that satisfy the database query after searching textualized digital transcripts of the audio portions of the content units 108 stored in association with the content units 108. These database queries may be generated using various languages including SQL, XPATH, and the like. The keywords 106a-c may also comprise other identifiers relevant to creating, or identifying, the proper query execution plan such as the title and the names of speakers featured in the content units 108 or other forms of additional information described above.

The keywords 106a-c may be formulated into database queries which are dynamic (meaning the query is generated as needed by a user with a form that is unknown until the query is received by the database server 101 and which form is likely to change between requests) or static (meaning the database query is predefined does not change form between requests, although the parametric data values of the query may change).

The dynamic database queries comprising the keywords 108-c may comprise more than just textualized words or phrases, but also logical bitwise operations that the indexing server 120 infers were intended by the user 112 such as NOR, OR, XOR, AND, NAND, and the like, as well as other information. The users 112 may be afforded a great deal of flexibility in searching for not just words and phrases, but combinations of words, phrases, and the like within the web media content.

Web media which satisfies a database query comprising the keywords 108 may be analyzed for informative or semantic density only after identifying instances of the keyword(s) 108 in the text. The web media content may be cached in computer readable memory and only those blocks of text satisfying the query execution plan relayed to the users 112 or modules configured to parse and quantify identifiers in the sentences 210 and clauses.

Figure 6:
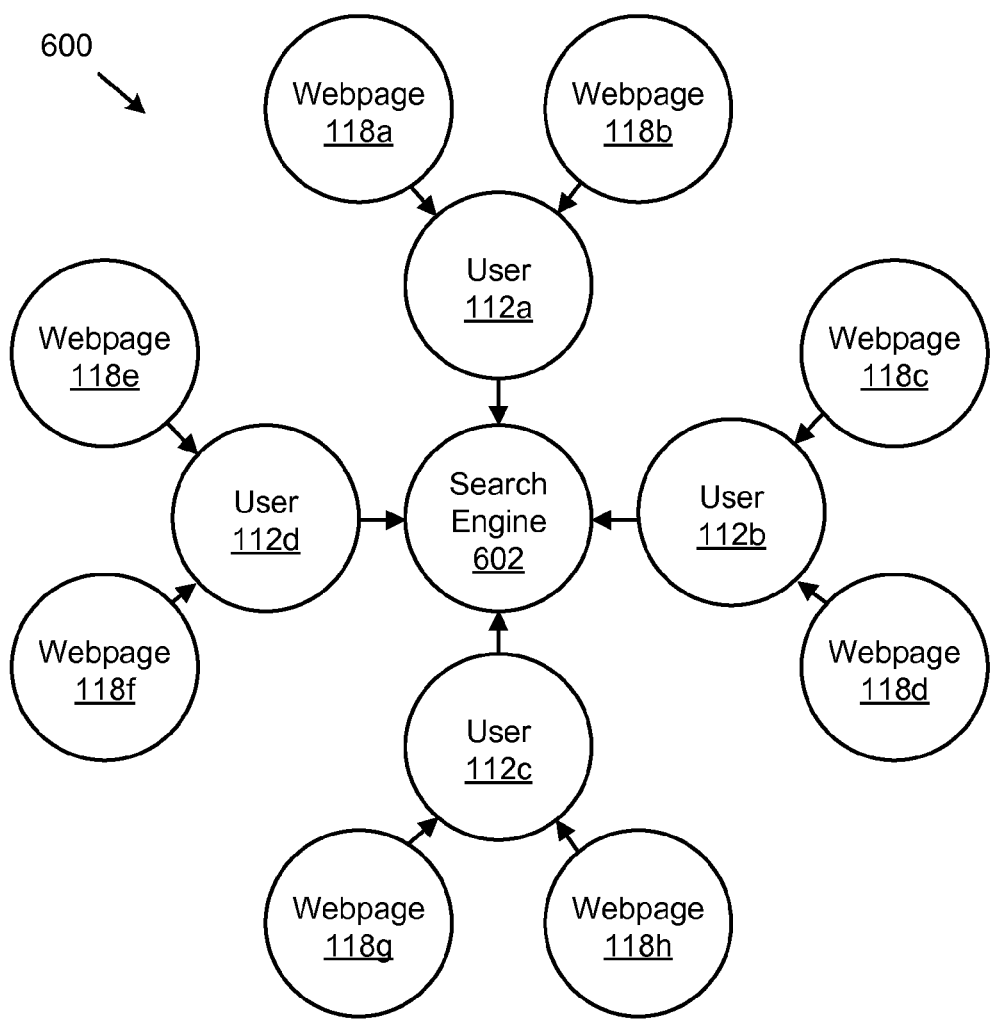
FIG. 6 is a Booch-relationship diagram illustrating the relationships between the search engine, users, and web media pages in accordance with the present invention.

FIG. 6 is a Booch-relationship diagram illustrating the interrelationships 600 between the search engine, users, and web media pages in accordance with the present invention. In the shown embodiment, a search engine 602, comprising the system 400, is given information by users 112a-d who have been made aware of specific webpages 118a-h which they want processed by the search engine 602.

Figure 7:
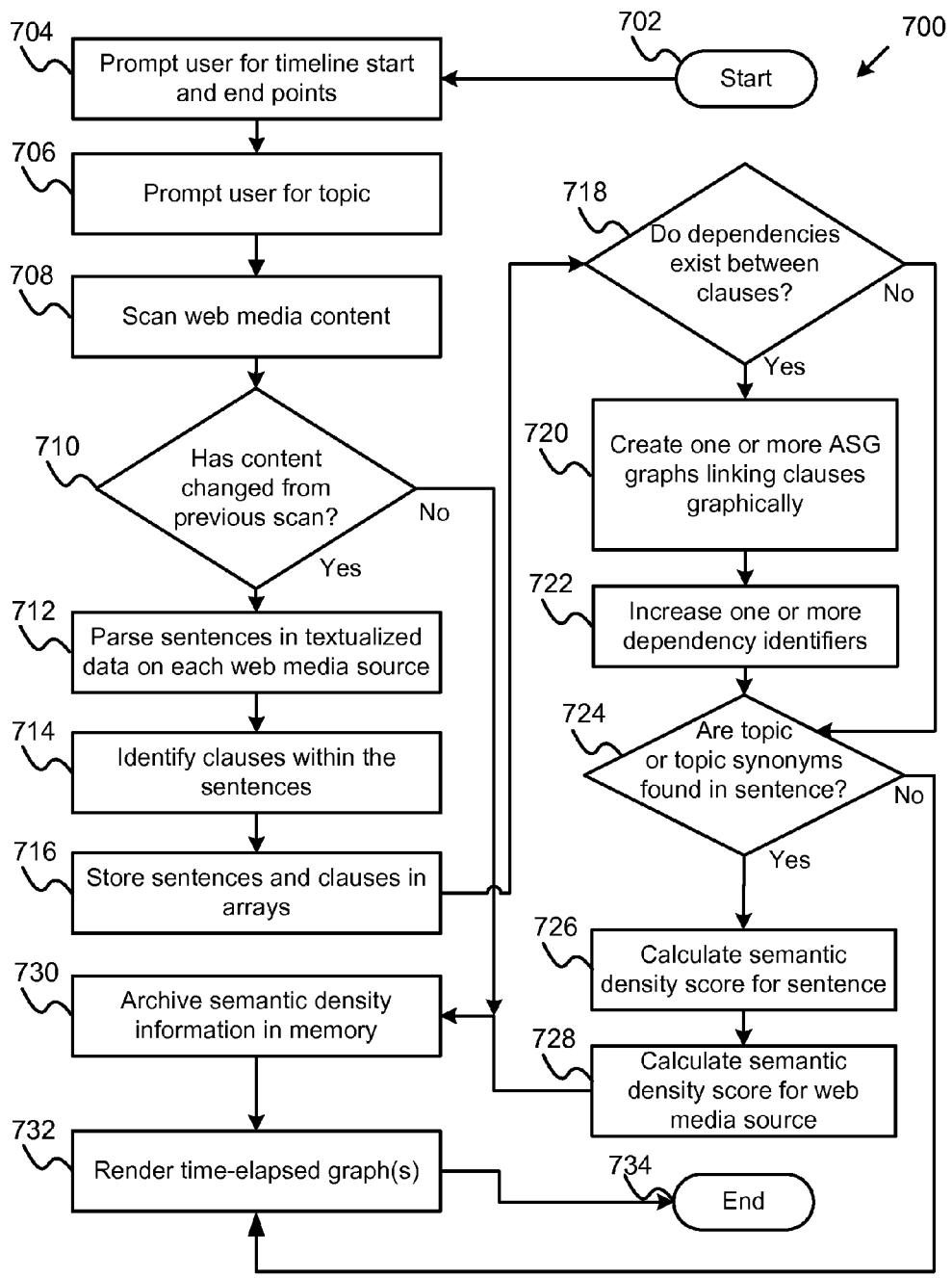
FIG. 7 is a flowchart illustrating method steps of the present invention, including steps which may be performed determining a semantic density of textualized digital web media in accordance with the present invention.

FIG. 7 is a flowchart illustrating method steps of the present invention, including steps which may be performed determining a semantic density of textualized digital web media in accordance with the present invention.

The method 700 begins 702 and progresses as shown. A user 112 is prompted 704 to input a timeline with start and end points (i.e. start and end dates). The users 112 is also prompted 706 for keyword 108 (e.g. a topic). Web media content identified by the user 112 is scanned 708 by the indexing server 120.

In the shown embodiment, if content has changed 710 from an earlier scan, information on web media page is scanned again and sentences 210 are parsed 712. Clauses are identified 714, and sentences are stored in arrays 716.

The dependencies between the clauses are identified and used in calculating the informative density, or semantic density of the sentence 210 containing the clause(s). In some embodiments, b-tree and/or ASG graphs are used to determine these dependencies. In other embodiments, dictionaries and thesauri are referenced to determine relations and correlations between words and/or clause(s).

In some embodiments of the present invention, blocks of text identified by a user 112 are searched for instances of the keyword(s) 108 after the semantic word density fo the blocks of text is determined. In other embodiments, large collections of web media pages are searched for instances of the keyword(s) 108 before semantic word density is calculated. In still further embodiments, the blocks of text may be searched for instances of synonyms of the keyword(s) 108, while in still further embodiments, instances of the keyword(s) 108 appearing the text may be substituted out and replaced with synonyms of the keyword(s) before performing further semantic word density analysis and calculation.

Figure 8A:
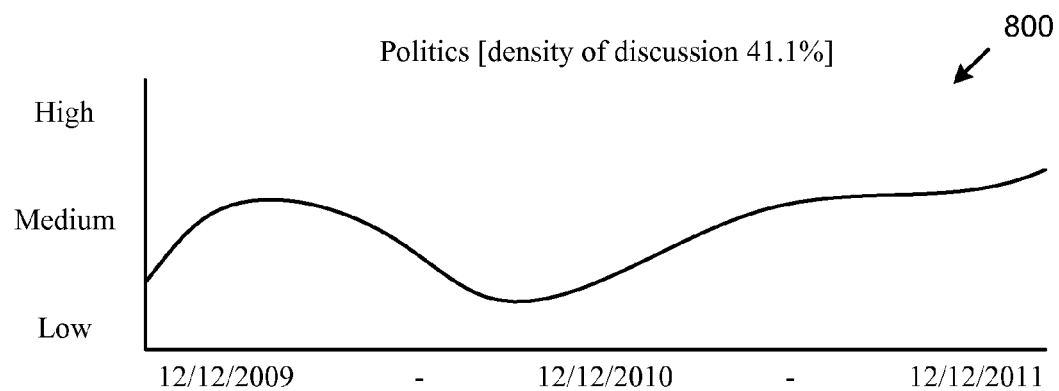
FIG. 8A is a line graph illustrated a time elapsed display of semantic density ratings for a general topic in accordance with the present invention.

FIG. 8A is a line graph 800 illustrating a time elapsed display of semantic density ratings for a general topic in accordance with the present invention. The general topic for which time elapsed semantic word density is shown is politics. The graph 800 shows word density, or the informative value of the discussion of politics, rising in 2009, slumping in 2010, and rising again in 2011. The sentences discussing politics average 41.1% of the maximum achievable density over the given 2009-2011 timeline 220.

Figure 8B:
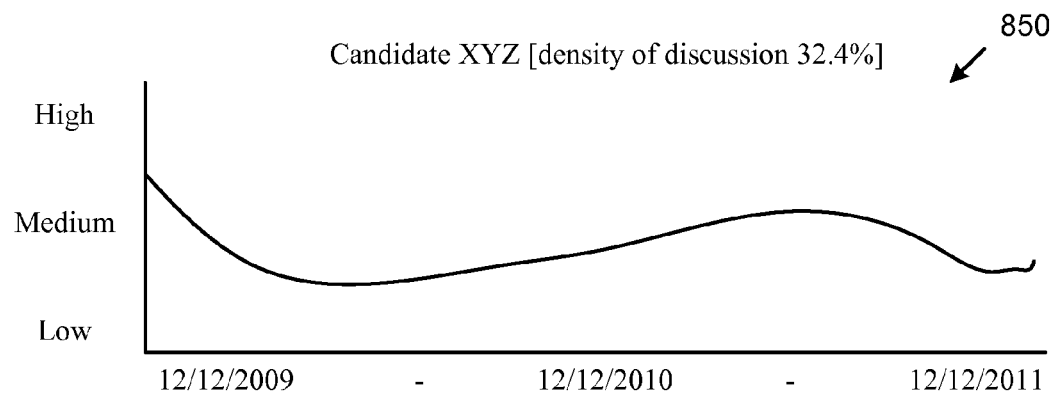
FIG. 8B is a line graph illustrated a time elapsed display of semantic density ratings for a specific topic in accordance with the present invention.

FIG. 8B is a line graph 850 illustrating a time elapsed display of semantic density ratings for a specific topic in accordance with the present invention.

The specific topic for which time elapsed semantic word density is shown is the name of political candidate. Examples might include Barack Obama, Mitt Romney, and the like. The graph 850 shows word density, or the informative value of the discussion of this candidate, falling in 2009, rising in 2010, and falling again in 2011. The sentences discussing politics average 32.4% of the maximum achievable density over the given 2009-2011 timeline 220.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory computer readable medium having computer usable program code executable to perform operations for determining an informative score of textualized digital web media, the operations of the computer program product comprising:
- compiling a list of web media sources for analysis in computer readable memory;
- querying the web media sources for a block of text;
- storing the block of text in volatile computer readable memory;
- identifying sentences within the block of text;
- storing the sentences as strings within an array;
- parsing each sentence to quantify one or more of the following:
  - a number of words in the sentence;
  - a number of prepositions, postpositions, adjectives, adverbs, verbs, nouns, and grammatical conjunctions, by referencing words within the sentence with a dictionary in computer readable memory;
  - a number of dependent clauses in the sentence;
  - a number of independent clauses in the sentence;
  - a number of ellipsis, a number of dashes (both en dashes and em dashes), and a number of commas, semicolons, and colons;
  - a number of subjects and predicates in the sentence;
  - a number of appositions in the sentence;
  - a number of syllables in each word of the sentence by cross-referencing each word with the dictionary in persistent storage; and
  - a number of alphanumeric characters in the sentence;
- storing each quantified number in a persistent computer readable database with a time-stamp identifying the date the number(s) were quantified;
- calculating a semantic density score for each web media source in the list of web media sources, wherein the semantic density score is a function of the quantified numbers for each sentence in the web media source; and
- storing the semantic density score in a persistent computer readable database, the score exclusively associated with the web media content from which the score was derived.

2. The computer program product of claim 1, further comprising:
- prompting a user with a webpage to input a topic for semantic density determination;
- prompting the user with a webpage to input a timeline for semantic density determination;
- prompting the user with a webpage to input (Uniform Resource Locators) URLs for one or more web media sources;
- determining synonym(s) for the topic by referencing a thesaurus in computer readable memory;
- querying textualized media on the web media source for instances of the topic;
- querying textualized media on the web media source for instances of synonyms of the topic identified by referencing the dictionary;
- storing semantic density ratings for sentences comprising the topic;
- storing semantic density ratings for sentences comprising the synonyms of the topic; and
- rendering a graph on a computer display showing elapsed time across one axis, the graph showing a plurality of semantic density ratings for the web media identified by the user.

3. The computer program product of claim 1, wherein the web media sources are queried at predetermined intervals of time.

4. The computer program product of claim 1, wherein the list of web media sources consists of web media sources manually identified by one or more users to the website.

5. The computer program product of claim 1, further comprising:
- for each sentence, creating one of an abstract semantic graph (ASG) and an abstract syntax tree (AST); and
- calculating a semantic density score for each web media source in the list of web media sources, wherein the semantic density score is a function of the number of clauses in each sentence of the web media source, the dependency identifier, and one or more of the ASG and the AST.

6. The computer program product of claim 1, further comprising storing a dictionary in computer readable memory, the dictionary identifying words of a language, the dictionary characterizing each word as one or more of a noun, verb, adverb, adjective, and preposition, the dictionary identifying a number of syllables in each word.

7. The computer program product of claim 1, wherein a dependent clause in the sentence is identified as a string of text not comprising a verb within two commas.

8. The computer program product of claim 1, wherein an independent clause in the sentence is identified as a string of text comprising a verb within two commas.

9. The computer program product of claim 1, where in the semantic density score is further a function of the number of sentences appearing in the block of text.

10. The computer program product of claim 1, wherein a database query is generated using the topic and synonyms, wherein the sentences are stored in a database in computer readable memory and queried with the database query by a (Database Management System) DBMS.

11. The computer program product of claim 1, further comprising rendered a graph on a computer display showing elapsed time across one axis, the graph showing a plurality of semantic word density ratings for the web media identified by the user.

12. A system to perform operations for determining a level of discussion of a topic, the system comprising:
- a webserver;
- a semantic indexing server;
- an (Relational Database Management System) RDBMS;
- a topic prompter module configured to prompt a user with a graphic user interface to input a topic for semantic density determination;
- a timeline prompter module configured to prompt the user with a graphic user interface to input a timeline for semantic density determination;
- a (Uniform Resource Locator) URL prompter module configured to prompt the user with a graphic user interface to input URLs for one or more web media sources, the URLs compiled into a list of web media sources for analysis in computer readable memory;
- a synonym determiner module configured to determine synonym(s) for the topic by referencing a thesaurus in computer readable memory;
- a block storer module configured to store the blocks of text forming the web media sources in volatile computer readable memory;

a sentence identifier module configured to identify sentences within the block of text;
a sentence parser module configured to parse each sentence to quantify one or more of the following:
   a number of words in the sentence;
   a number of prepositions, postpositions, adjectives, adverbs, verbs, nouns, and grammatical conjunctions, by referencing words within the sentence with a dictionary in computer readable memory;
   a number of dependent clauses in the sentence;
   a number of independent clauses in the sentence;
   a number of ellipsis, a number of dashes (both en dashes and em dashes), and a number of commas, semicolons, and colons;
   a number of subjects and predicates in the sentence;
   a number of appositions in the sentence;
   a number of syllables in each word of the sentence by cross-referencing each word with the dictionary in persistent storage; and
   a number of alphanumeric characters in the sentence;
a value storer module configured to store each quantified number in a persistent computer readable database with a time-stamp identifying the date the number(s) were quantified;
a calculator module configured to calculate a semantic density score for each web media source in the list of web media sources, wherein the semantic density score is a function of the quantified numbers for each sentence in the web media source;
a density storer module configured to store the semantic density score in a persistent computer readable database, the score exclusively associated with the web media content from which the score was derived;
a text querier module configured to query textualized media on the web media source for instances of the topic;
a synonym query module configured to query textualized media on the web media source for instances of synonyms of the topic identified by referencing the dictionary; and
a render module configured to render a graph on a computer display showing elapsed time across one axis, the graph showing a plurality of semantic density ratings for the web media identified by the user.

13. The system of claim 12, wherein sentences are identified within the block of text as being a string of text following a period (.) immediately followed by a space ( ) which string of text also precedes a period (.) immediately followed by a space ( ).

14. The system of claim 12, further comprising storing a dictionary in computer readable memory, the dictionary identifying words of a language, the dictionary characterizing each word as one or more of a noun, verb, adverb, adjective, and preposition, the dictionary identifying a number of syllables in each word.

15. The system of claim 12, wherein a dependent clause in the sentence is identified as a string of text not comprising a verb within two commas.

16. The system of claim 12, wherein an independent clause in the sentence is identified as a string of text comprising a verb within two commas.

17. The system of claim 12, further comprising a dependency analyzer module configured to analyze dependencies between the clauses and increasing the magnitude of a dependency identifier exclusively associated with the sentence, the dependency identifier increased for each dependency identified between a first clause and a second clause in the sentence, wherein a dependency comprises a clause with one or more characteristics from the group consisting of: a modifier in the first clause modifying a verb in a second clause; a modifier in a first clause modifying one of a noun, verb, and adverb in second clause; a complement in the first clause of one of a noun, adjective, adverb, or preposition in a second clause; and an interjection referencing a noun in the second clause.

18. The system of claim 12, further comprising rendering a graph on a computer display showing elapsed time across one axis, the graph showing a plurality of semantic word density ratings for the web media identified by the user.

19. A computer program product comprising a non-transitory computer readable medium having computer usable program code executable to perform operations for determining a semantic density of textualized digital web media, the operations of the computer program product comprising:
   prompting a user with a graphic user interface to input one or more keyword(s) for semantic density determination;
   prompting the user with the graphic user interface to input a timeline for semantic density determination;
   prompting the user with the graphic user interface to input domain names for one or more web media sources, the domain names compiled into a list of web media sources for analysis in computer readable memory;
   storing the blocks of text in the web media sources in volatile computer readable memory;
   identifying sentences within the block of text, wherein sentences are identified within the block of text as being a string of text following a period (.) immediately followed by a space ( ) which string of text also precedes a period (.) immediately followed by a space ( );
   storing the sentences as strings within an array;
   identifying clauses within the sentences satisfying one or more of the criteria from the group consisting of:
      a string of text enclosed ellipsis;
      a string of text enclosed by en dashes
      a string of text enclosed by em dashes;
      a string of text within the sentence enclosed by one or more of commas, semicolons, and colons;
      a string of text within the sentence comprising words following a subject-object-verb (SOV) word order;
      and string of text within the sentence comprising words following an agent-object-verb (AOV) order;
   storing the identified clauses as strings within an array;
   analyzing dependencies between the clauses and increasing the magnitude of a dependency identifier exclusively associated with the sentence, the dependency identifier increased for each dependency identified between a first clause and a second clause in the sentence, wherein a dependency comprises a clause with one or more characteristics from the group consisting of: a modifier in the first clause modifying a verb in a second clause; a modifier in a first clause modifying one of a noun, verb, and adverb in second clause; a complement in the first clause of one of a noun, adjective, adverb, or preposition in a second clause; and an interjection referencing a noun in the second clause;
   for each sentence, creating one of an abstract semantic graph (ASG) and an abstract syntax tree (AST);
   calculating a semantic density score for each web media source in the list of web media sources, wherein the semantic density score is a function of the number of clauses in each sentence of the web media source, the dependency identifier, and one or more of the ASG and the AST;

storing the semantic density score in a persistent computer readable database, the score exclusively associated with the web media content from which the score was derived;
determining synonym(s) for the keyword by referencing a thesaurus in computer readable memory;
querying the sentences for instances of the keyword and synonyms;
storing semantic density ratings for sentences comprising the keyword and synonyms; and
rendering a graph on a computer display showing elapsed time across one axis, the graph showing a plurality of semantic density ratings for the web media identified by the user.

20. The computer program product of claim 19, wherein a database query is generated using the keyword(s) and synonyms of the keyword(s), wherein the sentences are stored in a database in computer readable memory and queried with the database query by a (Database Management System) DBMS.

\* \* \* \* \*